United States Patent Office 3,325,514
Patented June 13, 1967

3,325,514
DIOXANE DERIVATIVES
George Hermann Büchi, Cambridge, Mass., and Max Stoll, Geneva, Switzerland, assignors to Pierre Marc Folliet, Verbier, Valais, Switzerland
No Drawing. Filed Feb. 5, 1963, Ser. No. 256,255
Claims priority, application Switzerland, Feb. 6, 1962, 1,369/62
10 Claims. (Cl. 260—340.2)

The present invention relates to new dioxane derivatives which have valuable organoleptic properties and are, therefore, useful as odoriferous agents in perfumery and as flavoring agents for foodstuffs, in particular foodstuffs comprising edible fats (other than butter) or oils. This invention further relates to foodstuffs, more particularly to edible fats other than butter, especially margarine, and oils containing the new dioxane derivatives as flavoring agents.

The dioxane derivatives of this invention are represented by the following general formula:

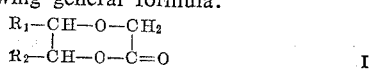

wherein $R_1$ and $R_2$ each represent hydrogen or an unsubstituted alkyl group having from 1 to 8 carbon atoms, one at least of $R_1$ and $R_2$ being such an alkyl group and the sum of the carbon atoms in $R_1$ and $R_2$ being from 4 to 8.

The alkyl groups represented by $R_1$ and/or $R_2$ in Formula I can have a straight or branched carbon chain. Straight chain alkyl groups are preferred in those dioxane derivatives which are intended to be used as flavoring agents.

The invention also comprises mixtures of two or more of the compounds of Formula I, provided that the individual components of any one of these mixtures all have the same number of carbon atoms. Mixtures of this type are obtained when the dioxane derivatives of this invention are prepared by the method described below. Examples of such mixtures are: 5-n-butyl-2-oxo-1,4-dioxane and 6-n-butyl-2-oxo-1,4-dioxane without or together with 5-methyl-6-n-propyl-2-oxo-1,4-dioxane and 5-n-propyl-6-methyl-2-oxo-1,4-dioxane; 5-n-pentyl-2-oxo-1,4-dioxane and 6-n-pentyl-2-oxo-1,4-dioxane without or together with 5-methyl-6-n-butyl-2-oxo-1,4-dioxane and 5-n-butyl-6-methyl-2-oxo-1,4-dioxane; 5-n-hexyl-2-oxo-1,4-dioxane and 6-n-hexyl-2-oxo-1,4-dioxane without or together with 5-methyl-6-n-pentyl-2-oxo-1,4-dioxane and 5-n-pentyl-6-methyl-2-oxo-1,4-dioxane; 5-n-octyl-2-oxo-1,4-dioxane and 6-n-octyl-2-oxo-1,4-dioxane without or together with 5-methyl-6-n-heptyl-2-oxo-1,4-dioxane and 5-n-heptyl-6-methyl-2-oxo-1,4-dioxane; etc.

The nomenclature used in the present specification for naming the new compounds corresponds to that established by "The Rules of Nomenclature for Organic Chemistry," drafted by the "Commission of Nomenclature for Organic Chemistry of the International Union of Pure and Applied Chemistry" [see Rule B–1].

In accordance with the invention the compounds of Formula I are obtained by condensing a mono-alkali metal derivative of an alkane-1,2-diol having from 6 to 10 carbon atoms with an ester of a halogeno-acetic acid, and cyclising the condensation product.

It is advantageous to use the mono-sodium derivatives of the alkane-1,2-diols. These derivatives are obtained, e.g. by subjecting the corresponding diols to the action of powdered sodium in an anhydrous inert medium, e.g. in xylene, in an inert atmosphere such as nitrogen. Subsequently, the reaction mixture can be treated with the halogeno-acetic acid ester, e.g. ethyl bromo-acetate or ethyl chloro-acetate, whereupon the obtained substituted acetate can be cyclised without being isolated by heating the reaction mixture. In the preparation of the mono-sodium derivative of the diol, sodium methoxide can be substituted for the powdered sodium.

In accordance with the invention the compounds of Formula I wherein $R_1$ represents an alkyl radical and $R_2$ is hydrogen are obtained by attaching a protective group on the primary hydroxyl of an alkane-1,2-diol containing from 6 to 10 carbon atoms, converting the obtained secondary mono-alcohol to a mono-alkali metal derivative thereof, condensing this derivative with a halogeno-acetate, removing said protective group and cyclising the thus obtained primary mono-alcohol. In this method the primary hydroxyl of the starting diol can be blocked e.g. by means of a trityl or a tetrahydropyranyl group. The tritylation and the tetrahydropyranylation can be carried out according to known methods. The preparation of the alkali metal derivative, e.g. the sodium derivative, of the secondary mono-alcohol and its condensation with a halogeno-acetate, e.g. ethyl bromo-acetate or chloro-acetate, can be carried out in the same manner as in the first method described above. If the protective group is a tetrahydropyranyl or trityl group, its removal is readily effected by acid hydrolysis, when the cyclisation occurs during the reaction.

The diols used as intermediates in the syntheses described above are known compounds which can be obtained by hydroxylating the corresponding 1-alkenes, e.g. by the action of a mixture of hydrogen peroxide and formic acid, and hydrolyzing the formed products.

When the intermediate alkane-1,2-diol is converted into its mono-sodium derivative by the methods described above without protecting the primary hydroxyl group, there is normally obtained a mixture of isomers one of which has its primary hydroxyl group converted into the sodium derivative, the other isomer having the hydrogen of its secondary hydroxyl group replaced by sodium. The proportions in which the two isomers are formed vary according to the conditions under which the reaction is carried out. Normally, the primary mono-sodium derivative is formed in a higher proportion than the secondary mono-sodium derivative. The condensation of this mixture of mono-sodium derivatives with the halo-acetic acid ester will also result in the formation of a mixture of substituted acetates which, on cyclisation, will yield a mixture of isomeric dioxanes. One of these dioxanes is alkyl-substituted in the 6-position and unsubstituted in the 5-position, the other isomer being alkyl-substituted in the 5-position and having its 6-position unsubstituted. The primary hydroxyl group of the diols being more reactive than the second hydroxyl group, the dioxane substituted in the 6-position will normally be the predominant component of the mixture of isomeric dioxanes.

In addition to the isomers described above, the dioxane products prepared according to the present invention may contain further isomers which are alkyl-substituted in both the 5- and 6-position. These isomers will be found in the end products if the 1-alkenes used as starting materials are commercial grade products. The commercial grade 1-alkenes in most cases contain minor quantities of impurities consisting of alkenes having their double bond in a position other than the 1-position, e.g. 2-alkenes. When these commercial 1-alkenes are hydroxylated in the manner described above in order to prepare the diols, the impurities will also be converted into diols. Thus, the 2-alkenes will yield the corresponding 2,3-diols which, upon conversion into the mono-sodium derivatives, condensation with the halo-acetate and cyclisation, will give rise to the formation of isomeric dioxanes having a methyl group in the 5- or 6-position and a further alkyl substituent in the 6- or 5-position, respectively. From 3-alkenes which might also be present in minute quantities in the commercial 1-alkenes there will be obtained dioxanes having an ethyl substitutent in the 5- or 6-position and a further alkyl substituent in the 6- or 5-position, respectively.

All the isomeric dioxane derivatives described above are odoriferous and flavoring agents. Thus, for most practical applications of the dioxane derivatives of this invention it is not necessary to separate the individual isomers. In many instances the odor or flavor effects resulting from the use of the mixtures of isomeric dioxanes are more interesting than those obtained with any one of the separated individual isomers.

The various types of isomeric dioxanes obtained according to this invention can be represented by the following formulae:

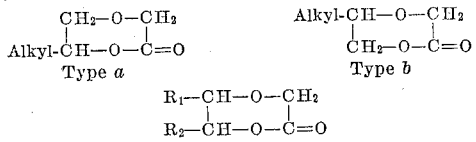

Type $c$: $R_1$ and $R_2$ = alkyl, $R_1$ having a lower number of carbon atoms than $R_2$;

Type $d$: $R_1$ and $R_2$ = alkyl, $R_2$ having a lower number of carbon atoms than $R_1$.

The products prepared according to the present invention will normally consist of at least 95% of type $a$ and type $b$ compounds. The ratio by weight between the compound of type $a$ and the compound of type $b$ in a given product depends on the specific reaction conditions applied in the synthesis of the product. When operating under the conditions set forth in Example 1 below, this ratio will be about 2 to 1. However, it is possible to obtain a dioxane products containing more than 90% of type $a$ compounds if the preparation of the mono-sodium salt of the diol is carried out by adding gradually powdered sodium to the solution of the diol instead of adding the diol solution to a dispersion of powdered sodium.

The isomers of any one of the mixtures obtained according to the invention have very similar physical properties and are, therefore, difficult to separate. The separation can be effected by gas-liquid chromatography or adsorption chromatography or by a combination of these methods.

The dioxane derivatives of this invention and their mixtures have odors with a predominating fatty note and less pronounced fruity notes. The taste of these compounds can be defined as fatty, slightly fruity and somewhat powdery.

Owing to their interesting organoleptic properties the compounds of this invention are valuable odoriferous and flavoring agents which can be used with success in perfumery as well as in the flavoring of foodstuffs.

In perfumery the new dioxane derivatives can be incorporated in perfume compositions of various odor types in order to impart thereto a fatty and more heavy note. In certain instances fractions of 1% of the dioxane derivatives, based on the weight of the total perfume compositions, will be sufficient for obtaining the desired odor-modifying effect whereas in other cases quantities up to e.g. 15% of the dioxanes are required for achieving a particular result.

It has been found that the compounds of this invention, when incorporated in small quantities in certain foodstuffs, impart thereto a flavor which is butter-like or at least reminiscent of butter. This phenomenon is all the more surprising as these compounds, when subjected to organoleptic tests in a pure, diluted state. suggest neither the odor nor the taste of natural butter.

Thus, the compounds of the invention permit a butter-like taste or at least a more butter-like taste to be imparted to foodstuffs comprising edible fatty material other than natural butter. The term "edible fatty material" is meant to include solid fats such as margarine, shortenings and other similar butter substitutes as well as edible oils of vegetable or animal origin. Very small amounts of the dioxane derivatives are sufficient to obtain the desired flavoring effects, these amounts being, by way of illustration, between 0.001 to 0.04‰ of the weight of the fatty material to be flavored. In order for the fatty materials to possess as natural a butter taste as possible it is, however, advantageous to incorporate therein, in addition to the dioxane derivatives further flavoring ingredients which are known to produce a butter-like flavor such as diacetyl and/or acetyl methyl carbinol and, if desired, butyric acid and possibly other straight-chain saturated aliphatic mono-carboxylic acids containing 3 and 5 to 10 carbon atoms, or other agents known in the art to be useful in the preparation of imitation butter flavors.

More particularly, the compounds of the present invention are very useful in the manufacture of margarine. The flavoring of margarine has always been and still is a delicate problem. It is very difficult to reproduce the taste and the flavor of natural butter in margarine. One of the conventional methods of flavoring margarine consists in incorporating therein during its manufacture flavoring compositions based on diacetyl and/or acetyl methyl carbinol and/or butyric acid and other alkanoic acids such as propionic, valerianic, caproic, caprylic, capric acids, etc., and other additional substances such as methyl ketones. The flavoring effects obtainable with compositions of this kind are often very disappointing. The dioxanes disclosed in this specification make possible a considerable improvement of the flavoring properties of the known compositions used for the flavoring of margarine. By incorporating in the margarine compositions which contain the new dioxanes in addition to the conventional ingredients it is possible to develop in the margarine a more complete and richer butter flavor, that is to say a more natural flavor, than in the case where flavoring compositions which do not contain said dioxanes are used. New imitation butter flavors are thus made available which are useful for flavoring not only margarine and other edible fatty materials but also foodstuffs such as for example bakery, pastry and confectionery products. The dioxane content of these butter flavors can vary considerably depending on the number and the type of the other flavoring ingredients present and their proportions, and depending on the kind of foodstuff to be flavored. Butter flavors which are to be incorporated in margarine may contain for example from 5 to 15 % by weight of dioxane derivative, based on the total weight of all the flavor ingredients (excluding the solvent or diluent which may be used). The amount of dioxane derivative may be increased to more than 15%, e.g. up to 30% by weight, if butter flavors are to be made for the purpose of flavoring foodstuffs other than fatty materials.

Favorable flavoring effects are achieved when mixtures of two or more compounds of this invention are incorporated in margarine. Such mixtures produce a richer and better balanced flavor than a single dioxane derivative. Thus, e.g., good results are obtained with mixtures of 1 part by weight of 6-n-pentyl-2-oxo-1,4-dioxane, 2 parts by weight of 6-n-hexyl-2-oxo-1,4-dioxane and 2 parts by weight of 6-n-butyl-2-oxo-1,4-dioxane, 1 part by weight of 5-n-pentyl-2-oxo-1,4-dioxane, 2 parts by weight of 6-n-pentyl-2-oxo-1,4-dioxane, 2 parts by weight of 5-n-butyl-2-oxo-1,4-dioxane, 4 parts by weight of 6-n-butyl-2-oxo-1,4-dioxane, 2 parts by weight of 5-n-hexyl-2-oxo-1,4-dioxane and 4 parts by weight of 6-n-hexyl-2-oxo-1,4-dioxane.

The dioxane derivatives of this invention or their mixtures with additional flavoring ingredients are preferably added to the margarine in the form of solutions or dispersions in order to have the flavor more uniformly distributed in the margarine. Solvents or diluents which may be used for this purpose are, for instance, lactic acid, triacetin, and unflavored edible oils.

The dioxane derivatives or their mixtures with additional flavoring ingredients can be incorporated in the margarine at any convenient stage of its manufacture, e.g. during the churning operation. The method used for incorporating imitation butter flavors are well-known to those skilled in the art and need not be described in detail here.

A particular advantage of the dioxane derivatives of this invention resides in the fact that due to the strongly nucleophilic character of the ring oxygens they tend to form hydrogen-bonded aggregates with compounds containing hydroxyl groups such as partially esterified glycerol derivatives, hydroxy acids, etc., occurring in the fat mixture of margarine. This formation of aggregates tends to fix the dioxane derivatives in the fat mixture and to prevent a loss of flavoring power due to evaporation.

The following examples are illustrative of methods for preparing the dioxane derivatives of this invention.

*Example 1*

291.4 g. of hydrogen peroxide (30% by volume) are slowly added within 1 hour to a mixture of 240 g. of commercial 1-heptene (B.P. $_{730}$=90–92° C.;

$$n_D^{20}=0.6939$$

$d_4^{20}=0.9093$), and 2.89 litres of 98% formic acid, the temperature being maintained below 45° C. When this operation is completed, the solution is heated for 24 hours at 50° C., the formic acid is removed by distillation under reduced pressure, and the residue is hydrolysed with 530 g. of potassium hydroxide in 3 litres of water. Heptane-1,2-diol is isolated by extraction with ether and the usual treatments and finally distilled; B.P. $_{9\ mm.}$=120–122° C.

23 g. of powdered sodium are stirred in 2 litres of anhydrous xylene in a nitrogen atmosphere, and 134 g. of heptane-1,2-diol dissolved in 1 litre of anhydrous xylene are added to the mixture. The mixture is then refluxed for 2 hours. The reaction mixture is then cooled to 0° C., whereupon 167 g. of ethyl bromo-acetate are added thereto, and the mixture is slowly heated to 130° C. (bath temperature), the alcohol being removed as it forms in the cyclisation reaction. The reaction mixture is then cooled, washed with water, dried and concentrated. The residue is distilled to obtain a product of B.P. $_{0.001\ mm.}$=82° C.; $d_4^{20}$=1.0236; $n_D^{20}$=1.4532. This product comprises a mixture of 5- and 6-pentyl-2-oxo-1,4-dioxanes and can be used as such for flavoring purposes.

The individual dioxanes were separated by gas-liquid chromatography in an F. & M. chromatograph using a 30% Apiezon column of 2.5 m. (c. 109), at 225° C., and identified by mass spectrography. The figures given hereinafter each correspond to the highest peak in each groups of fragments in the order of decreasing intensities.

5-pentyl-2-oxo-1,4-dioxane: 43, 55, 29, 72, 82, 99, 100, 172, 113.
6-pentyl-2-oxo-1,4-dioxane: 43, 56, 70, 29, 81, 96, 113, 127, 143, 172.

*Example 2*

22.1 g. of powdered sodium are stirred in 1.8 litres of anhydrous xylene in a nitrogen atmosphere, and then 140 g. of octane-1,2-diol [M.P.=28–31° C.; prepared from 1-octene (B.P. $_{730}$=117–120° C.; $d_4^{20}$=0.7152; $n_D^{20}$=1.4086) in the manner described in Example 1] dissolved in 1 litre of xylene are introduced. The mixture is refluxed for 2 hours. The reaction mixture is cooled to 0° C., whereupon 160 g. of ethyl bromo-acetate are added and the mixture is slowly heated to 130° C. (bath temperature), the alcohol being distilled off as it forms in the cyclisation reaction. The reaction mixture is then filtered to remove the sodium bromide formed in the reaction, the filtrate is concentrated and the residue distilled. There is thus obtained a product having the following physical properties:

B.P. $_{0.004\ mm.}$=98° C.; $d_4^{20}$=1.0166; $n_D^{20}$=1.4535

This product comprises a mixture of 5- and 6-hexyl-2-oxo-1,4-dioxanes and can be used as such for flavoring purposes.

The individual dioxanes were separated and identified in the manner described in Example 1. The compounds are characterized by the following mass-spectrographic data:

5-hexyl-2-oxo-1,4-dioxane: 43, 55, 29, 71, 86, 96, 113, 114, 186, 127, 155, 143.
6-hexyl-2-oxo-1,4-dioxane: 43, 70, 55, 29, 83, 95, 110, 127, 141, 157, 186.

*Example 3*

By proceeding in the manner described in Example 1, but using 94.4 g. of hexane-1,2-diol (B.P. $_{10}$=112–113° C.) prepared from 1-hexene in the manner described in Example 1), 17.3 g. of sodium and 133 g. of ethyl bromo-acetate, there is obtained a product of B.P. $_{0.01mm.}$=72° C.

This product comprises a mixture of 5- and 6-butyl-2-oxo-1,4-dioxanes and can be used as such for flavoring purposes or in perfumery.

The individual dioxanes were separated and identified in the manner described in Example 1. The components are characterized by the following mass-spectrographic data:

5-butyl-2-oxo-1,4-dioxone: 43, 55, 29, 71, 85, 86, 158, 99, 115.
6-butyl-2-oxo-1,4-dioxane: 43, 56, 71, 29, 84, 99, 114, 129, 158.

*Example 4*

By proceeding in accordance with Example 1, but using 131.5 g. of decane-1,2-diol (B.P. $_9$=150–153° C.) (prepared from 1-decene in the manner described in Example 1) 17.35 g. of sodium and 126.5 g. of ethyl bromo-acetate, there is obtained a produce of B.P. $_{0.002\ mm.}$=105° C.

This product comprises a mixture of 5- and 6-octyl-2-oxo-1,4-dioxanes and can be used as such for flavoring purposes and in perfumery.

The individual dioxanes were separated and identified in the manner described in Example 1. The components are characterized by the following mass-spectrographic data:

5-octyl-2-oxo-1,4-dioxane: 43, 55, 71, 29, 83, 99, 114, 124, 141, 142, 214, 155.
6-octyl-2-oxo-1,4-dioxane: 43, 55, 70, 29, 98, 83, 111, 123, 138, 155, 169, 185, 214.

*Example 5*

65 g. of heptane-1,2-diol are stirred with 3 ml. of concentrated hydrochloric acid, and 44 g. of dihydropyran are added drop by drop at such a rate that the temperature does not rise beyond 45° C. When the reaction is completed, solid potassium carbonate is added to the reaction mixture. The following day the product is decanted and distilled. There is thus obtained 1-(tetrahydropyran-2-yl)-2-hydroxy-heptane, B.P. $_{0.02\ mm.}$=98° C.

This product is subjected to the action of sodium and ethyl bromo-acetate in the manner described in the preceding examples. The reaction mixture is treated in the usual manner to obtain ethyl 1-(tetrahydropyran-2-yloxy)-2-heptyloxy-acetate. This product is hydrolysed by means of aqueous-alcoholic hydrochloric acid. After conventional treatment of the hydrolysis mixture, the crude product is distilled to obtain 5-pentyl-2-oxo-1,4-dioxane, B.P. $_{0.005\ mm.}$=80° C. This compound differs from its 6-pentyl homologue in that it has a longer retention time on Apiezon (30% on silicone) columns in gas-liquid chromatography.

In the products prepared according to Examples 1 to 5 the ratio by weight between the 5-alkyl- and 6-alkyl-2-oxo-1,4-dioxanes is about 1 to 2.

Example 6

To a solution of 244 g. 1-octene in 2600 ml. formic acid (98%) are added dropwise 260 g. hydrogen peroxide (30% vol.). There is a rise in temperature, and it is occasionally necessary to cool the mixture to prevent it rising above 45° C. After the introduction is finished, the temperature of the mixture is maintained at 45° C. for 24 hours, when the formic acid is removed by distillation at reduced pressure (about 40 mm. is suitable). The residue is treated with a solution of 750 g. potassium hydroxide in 3500 ml. water. Hydrolysis of the esters present occurs, with a rise in temperature. The reaction is brought to completion by heating for 30 min. on the water bath, and the product isolated with ether. There is thus obtained octane-1,2-diol of B.P. $_8$=130° C.

To a well-stirred suspension of 22.1 g. powdered sodium in 1800 ml. dry xylene is added under nitrogen 140 g. octane-1,2-diol in 1000 ml. dry xylene. The mixture is heated under reflux for 2 hours, then cooled somewhat, and 160 g. ethyl bromo-acetate is added slowly. The temperature rises and after the addition is complete, the mixture is again heated to remove the alcohol formed during the reaction. The mixture is cooled and the precipitated bromide filtered off, the filtrate being concentrated under reduced pressure. Distillation of the residue yields a product of B.P. $_{0.01}$=100–103° C.

This product comprises a mixture which consists mainly of 5- and 6-hexyl-2-oxo-1,4-dioxanes (about 30% and 60%, respectively) and also contains minor quantities of 5-methyl-6-n-phenyl-2-oxo-1,4-dioxane (about 5%) and 5-n-pentyl-6-methyl-2-oxo-1,4-dioxane (about 5%).

The individual components of this mixture were separated by gas-liquid chromatography on an F. & M. chromatograph using an Apiezon column (30% Apiezon on silicone) of 2.5 m. (c. 109), at 225° C., and identified by mass-spectrography. The mass-spectrographic data of 6-n-hexyl-2-oxo-1,4-dioxane (M.P. 32–33° C.) and of 5-n-hexyl-2-oxo-1,4-dioxane are indicated in preceding Example 2. The mass-spectrographic data of the two other isomeric dioxanes are as follows:

5-methyl-6-pentyl-2-oxo-1,4-dioxane: 43, 57, 81, 68, 95, 110, 186.

5-pentyl-6-methyl-2-oxo-1,4-dioxane: 43, 58, 86, 71, 99, 112, 186.

The following examples illustrate the use of the new dioxane derivatives in the preparation of perfume compositions.

Example 7

A perfume composition of the tuberose type is prepared by blending the ingredients listed below in the proportions set forth:

| Ingredients: | Parts by weight |
|---|---|
| 10% decanal | 10 |
| Amylcinnamic aldehyde | 40 |
| Dodecanol | 5 |
| Linalool | 90 |
| Nerol | 20 |
| Terpineol | 40 |
| Farnesol | 30 |
| Methyl benzoate | 60 |
| Ethyl anthranilate | 45 |
| Isobutyl salicylate | 30 |
| Benzyl acetate | 60 |
| Linalyl benzoate | 90 |
| Cinnamyl formate | 60 |
| Benzyl benzoate | 100 |
| Eugenol | 5 |
| 10% isojasmone | 35 |
| 10% indol | 30 |
| Mixture of 5- and 6-n-pentyl-2-oxo-1,4-dioxanes (ratio by weight: about 1:2) | 40 |
| Mixture of 5- and 6-n-hexyl-2-oxo-1,4-dioxanes (ratio by weight: about 1:2) | 35 |
| Mixture of 5- and 6-n-octyl-2-oxo-1,4-dioxanes (ratio by weight: about 1:2) | 15 |
| Ylang I | 70 |
| Balsam of Peru | 60 |
| Balsam of tolu | 30 |
| | 1000 |

Example 8

A composition of the chypre type is prepared by blending the ingredients listed below in the proportions set forth:

| Ingredients: | Parts by weight |
|---|---|
| Bergamot | 150 |
| Ylang I | 30 |
| Sweet orange oil | 30 |
| Oak moss absolute | 60 |
| Nutmeg | 15 |
| Galbanum essence | 5 |
| Purified styrax | 30 |
| Clove oil of Zanzibar | 10 |
| Benzoin resin, Siam | 25 |
| Synthetic rose | 120 |
| Synthetic jasmin | 60 |
| Methyl ionone | 60 |
| Sandalwood oil, East India | 40 |
| Patchouli | 20 |
| Vetiveryl acetate | 30 |
| Coumarin | 40 |
| Heliotropin | 20 |
| Musk ketone | 60 |
| Labdanum resinoid | 15 |
| Mixture of 5- and 6-n-pentyl-2-oxo-1,4-dioxanes (ratio by weight: about 1:2) | 15 |
| Civet (natural), 10% | 30 |
| 3% amber infusion | 60 |
| Neroli bigarade | 15 |
| Rose absol. | 20 |
| Bulgarian rose oil | 20 |
| Jasmin absol. | 20 |
| | 1000 |

The following examples are illustrative of foodstuffs flavored in accordance with the present invention.

Example 9

A mixture of equal parts by weight of pentyl-2-oxo-1,4-dioxane (comprising 5- and 6-pentyl-2-oxo-1,4-dioxane in a weight ratio of about 1:2), hexyl-2-oxo-1,4-dioxane (comprising 5- and 6-hexyl-2-oxo-1,4-dioxanes in a weight ratio of about 1:2) and butyl-2-oxo-1,4-dioxane (comprising 5- and 6-butyl-2-oxo-1,4-dioxanes in a weight ratio of about 1:2) was dissolved in triacetin at a concentration of 2% of total dioxanes.

This flavoring solution was incorporated in a conventional margarine fat emulsion during the churning operation. The flavoring solution was used in a proportion of 200 g. for 100 kg. of margarine fat emulsion so that the finished margarine had a dioxane content of about 0.04‰ by weight.

The margarine prepared in this manner tasted more butter-like than a margarine of the same composition but containing no flavoring dioxanes.

A more complete and natural butter flavor is obtained when the dioxane derivatives of this invention are incorporated in margarine together with additional conventional flavor ingredients as is exemplified by the following example.

Example 10

A number of flavoring compositions were prepared by blending the ingredients listed in the following table.

TABLE

| Ingredients | Parts by weight | | | | | | | |
|---|---|---|---|---|---|---|---|---|
| | A | B | C | D | E | F | G | H |
| Pentyl-2-oxo-1,4-dioxane¹ | 1 | 1 | 1 | 1 | | | 1 | 1 |
| Hexyl-2-oxo-1,4-dioxane² | 2 | 2 | 2 | 2 | 5 | 5 | 2 | 2 |
| Butyl-2-oxo-1,4-dioxane³ | 2 | 2 | 2 | 2 | | | 2 | 2 |
| Diacetyl | 20 | 20 | 20 | 20 | 5 | 20 | 5 | 20 |
| Acetyl methyl carbinol | 20 | 20 | 20 | 20 | 20 | 20 | 20 | 20 |
| Butyric acid | 20 | 20 | 20 | 20 | 20 | 20 | 20 | 20 |
| Isobutyric acid | | | 0.05 | 1 | | | | |
| Caproic acid | | | | | 3 | 3 | | |
| Caprylic acid | | | | | 2 | 2 | | |
| Methyl amyl ketone | 0.1 | 0.05 | 0.05 | 0.05 | | | | |
| Lactic acid | | | | | 45 | 30 | 50 | 35 |
| Triacetin | 34.9 | 34.95 | 34.9 | 33.95 | | | | |
| Total | 100.0 | 100.00 | 100.0 | 100.00 | 100 | 100. | 100 | 100 |

¹ Mixture of 5- and 6-pentyl-2-oxo-1,4-dioxanes (weight ratio about 1:2).
² Mixture of 5- and 6-hexyl-2-oxo-1,4-dioxanes (weight ratio about 1:2).
³ Mixture of 5- and 6-butyl-2-oxo-1,4-dioxanes (weight ratio about 1:2).

Each of the flavoring compositions A to H was incorporated in separate portions of the same batch of a conventional margarine fat emulsion during the churning operation. Each flavoring composition was used in a proportion of about 0.06 g. for 1 kg. of margarine fat emulsion so that the finished margarine had a dioxane content of about 3 mg. per kg.

The margarine samples flavored with flavor compositions A to H had a flavor and aroma resembling very much that of natural butter. Furthermore, these margarine samples tasted distinctly more butter-like than a margarine sample of the same composition and flavored with a flavoring composition containing the same ingredients as any of compositions A to H but comprising no dioxane derivatives.

We claim:

1. A composition of matter which has the empirical formula $C_nH_{2n-2}O_3$ wherein $n$ is an integer from 8 to 12 and which comprises a member selected from the group consisting of a compound of the structural formula

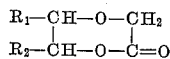

and mixtures of at least two compounds of said structural formula wherein $R_1$ and $R_2$ each represent a member selected from the group consisting of hydrogen and unsubstituted alkyl groups having from 1 to 8 carbon atoms, one at least of $R_1$ and $R_2$ being such an alkyl group, and the sum of the carbon atoms in $R_1$ and $R_2$ being from 4 to 8, the individual components of any one of said mixtures all having the same number of carbon atoms.

2. A composition of matter which has the empirical formula $C_nH_{2n-2}O_3$ wherein $n$ is an integer from 8 to 12 and which consists of a mixture of at least two compounds of the formula

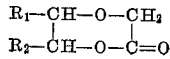

wherein $R_1$ and $R_2$ each represent a member selected from the group consisting of hydrogen and unsubstituted alkyl groups having from 1 to 8 carbon atoms, one at least of $R_1$ and $R_2$ being such an alkyl group, and the sum of the carbon atoms in $R_1$ and $R_2$ being from 4 to 8, the individual components of said mixture all having the same number of carbon atoms.

3. A composition of matter according to claim 2 which comprises a mixture substantially consisting of the two isomers (a) 5-n-butyl-2-oxo-1,4-dioxane and (b) 6-n-butyl-2-oxo-1,4-dioxane, isomer (b) being present in a higher proportion than isomer (a).

4. A composition of matter according to claim 2 which comprises a mixture substantially consisting of the two isomers (a) 5-n-pentyl-2-oxo-1,4-dioxane and (b) 6-n-pentyl-2-oxo-1,4-dioxane, isomer (b) being present in a higher proportion than isomer (a).

5. A composition of matter according to claim 2 which comprises a mixture substantially consisting of the two isomers (a) 5-n-hexyl-2-oxo-1,4-dioxane and (b) 6-n-hexyl-2-oxo-1,4-dioxane, isomer (b) being present in a higher proportion than isomer (a).

6. A composition of matter according to claim 2 which comprises a mixture substantially consisting of the two isomers (a) 5-n-octyl-2-oxo-1,4-dioxane and (b) 6-n-octyl-2-oxo-1,4-dioxane, isomer (b) being present in a higher proportion than isomer (a).

7. 6-n-butyl-2-oxo-1,4-dioxane.
8. 6-n-pentyl-2oxo-1,4-dioxane.
9. 6-n-hexyl-2-oxo-1,4-dioxane.
10. 6-n-octyl-2-oxo-1,4-dioxane.

References Cited
UNITED STATES PATENTS

| | | | |
|---|---|---|---|
| 2,142,033 | 12/1938 | McNamee et al. | 260—340.2 |
| 2,803,646 | 8/1957 | Bell et al. | 260—340.2 |
| 2,900,395 | 8/1959 | Guest et al. | 260—340.2 |
| 2,928,746 | 3/1960 | Donahue et al. | 99—123 |
| 2,983,615 | 5/1961 | Melnick | 99—123 |

WALTER A. MODANCE, *Primary Examiner.*

M. W. GREENSTEIN, NORMA S. MILESTONE,
*Assistant Examiners.*